March 14, 1967  M. FRIEDMAN ETAL  3,309,201
PHOTOGRAPHIC MINIATURE TRANSPARENCY FILM PRODUCT
Filed Dec. 28, 1962
5 Sheets-Sheet 1
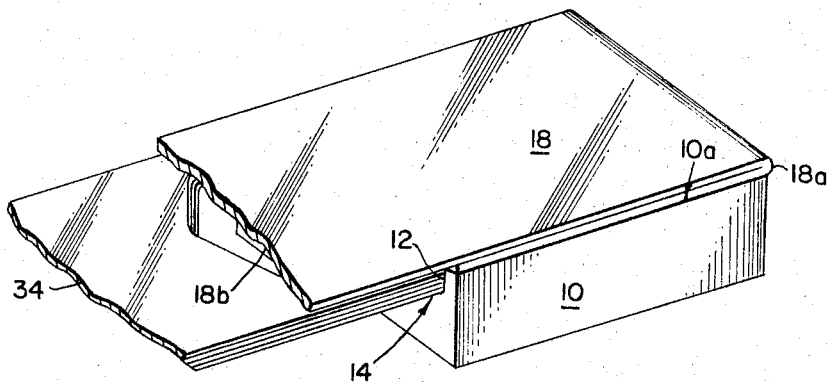
FIG.1
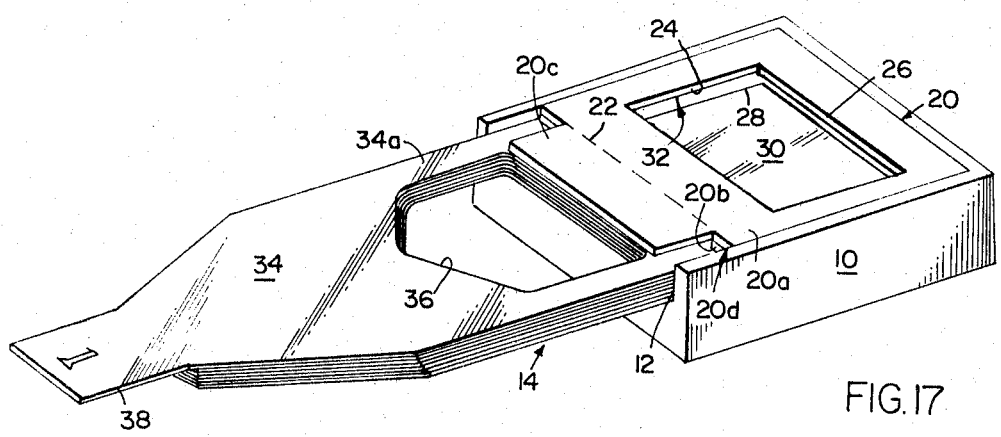
FIG.2    FIG.17
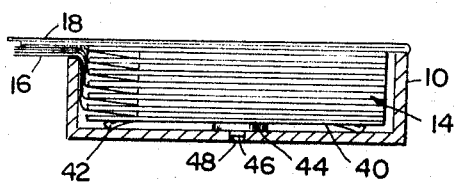
FIG.3
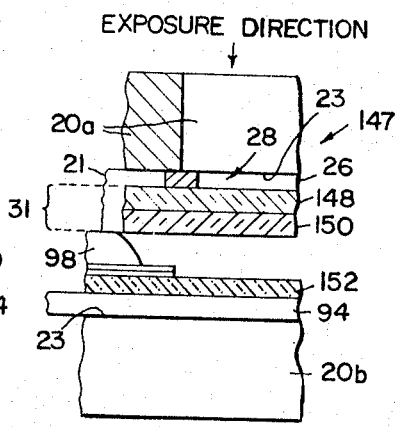
INVENTORS
Melvin Friedman
and
Frank W. Knight, Jr.
BY
Brown and Mikulka
ATTORNEYS

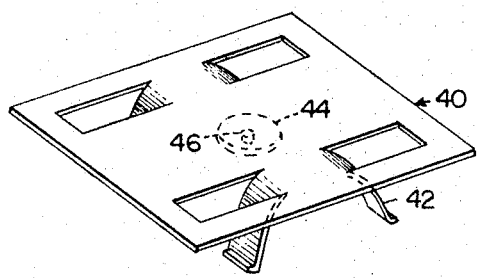
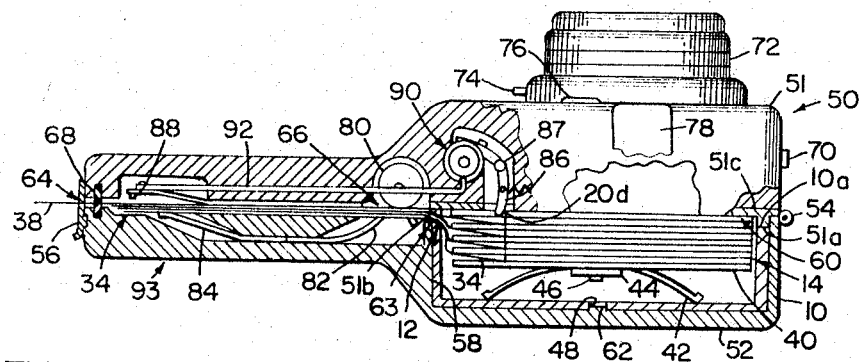
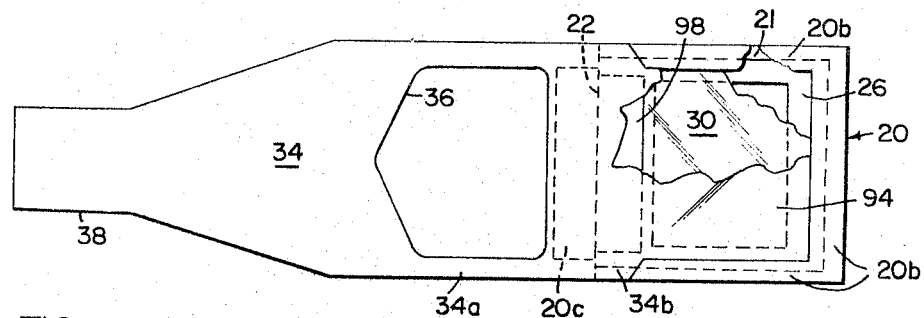
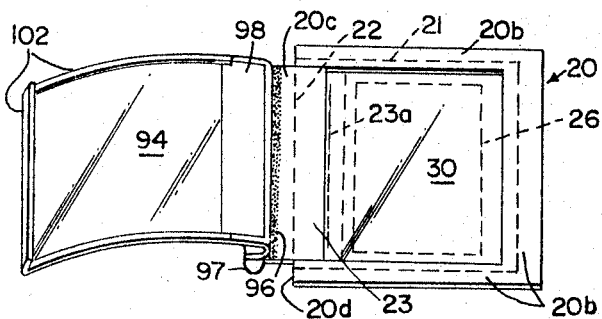

March 14, 1967 M. FRIEDMAN ETAL 3,309,201
PHOTOGRAPHIC MINIATURE TRANSPARENCY FILM PRODUCT
Filed Dec. 28, 1962 5 Sheets-Sheet 3

INVENTORS
Melvin Friedman
Frank H. Knight, Jr.
BY
Brown and Mikulka
ATTORNEYS

March 14, 1967 M. FRIEDMAN ETAL 3,309,201
PHOTOGRAPHIC MINIATURE TRANSPARENCY FILM PRODUCT
Filed Dec. 28, 1962 5 Sheets-Sheet 4
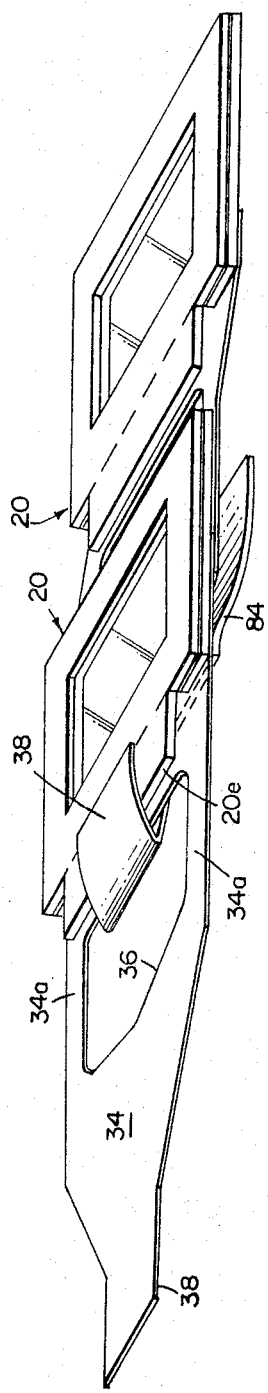
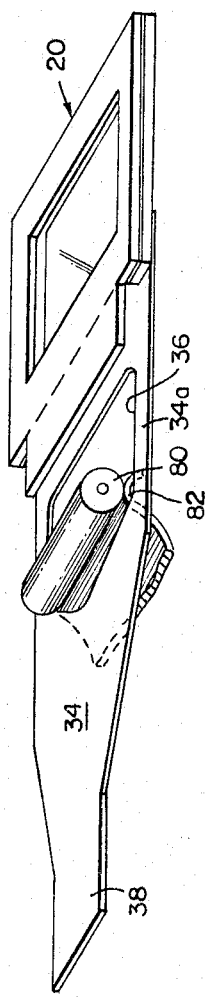
INVENTORS
Melvin Friedman
Frank H. Knight, Jr.
BY
Brown and Mikulka
ATTORNEYS

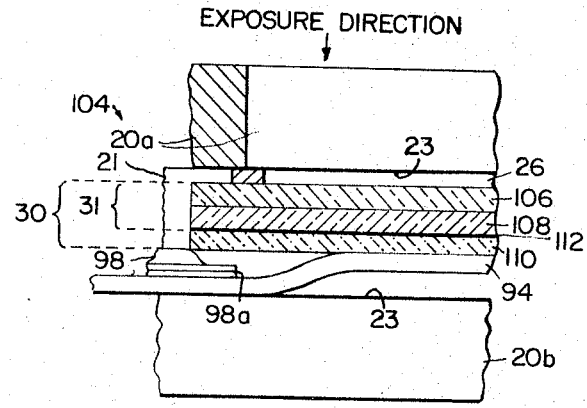
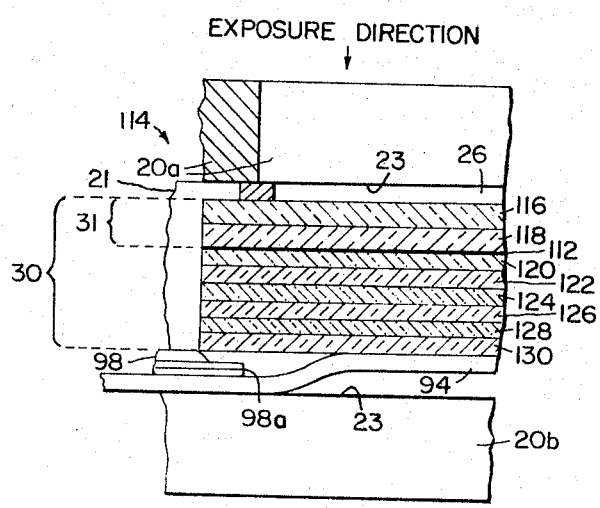
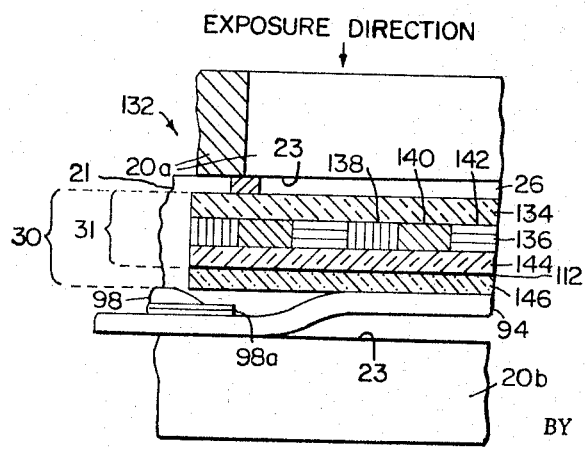

3,309,201
PHOTOGRAPHIC MINIATURE TRANSPARENCY
FILM PRODUCT
Melvin Friedman, Watertown, Mass., and Frank W.
Knight, Jr., Salem, N.H., assignors to Polaroid Corporation, Cambridge, Mass., a corporation of Delaware
Filed Dec. 28, 1962, Ser. No. 248,093
24 Claims. (Cl. 96—76)

This invention relates to a novel photographic film unit or assembly and to a plurality of said film units releasably mounted in a container.

The film unit of the present invention is adapted, when photographically exposed in a so-called self-developing or self-processing camera and treated therein by processing substances contained in the film unit itself, to produce a completed print, especially one in the form of a transparency. Moreover, assuming a transparency, it is already mounted in a slide mount when it comes from the camera, after exposure and processing therein, and can practically immediately be used for projection or other viewing procedure. This avoids the extra labor and expense customarily required in preparing a transparency for such a purpose. The film unit is intended for use with a miniature or so-called 35 mm. camera of a type in which the film unit is adapted to be exposed, advanced and processed, and then removed from the camera, in succession. A camera which is suitable for use with film units of the present invention is shown herein and is described in greater detail in the copending U.S. application Serial No. 248,092, filed concurrently herewith, now U.S. Patent 3,225,670.

The film unit of the invention comprises a releasably contained processing liquid and is of a multilayer structure. After the photographic exposure and release of the processing liquid, as through the application of a compresive force to external surfaces of the film unit, a short period is allowed for imbibition of the liquid into predetermined portions or layers, including at least one silver halide emulsion layer. An image is formed by the diffusion transfer of image-forming substances to a proper image-receiving surface or layer of the unit, which layer, in the formation of the preferred transparency, is composed of a transparent material. While adapted to produce, with great rapidity, either black-and-white or color transparencies, film units of the invention, in accordance with preferred end usage, are particularly intended to provide transparencies in full color. A suitable processing liquid may comprise an aqueous solution of a silver halide developer such as hydroquinone, a silver halide solvent of the type of sodium thiosulfate, and an alkaline substance such as sodium hydroxide. It may also preferably contain a thickening or film-forming agent such as a synthetic polymer of the type of sodium carboxymethyl cellulose to provide a desired viscosity. In producing a black-and-white image, upon imbibition of the processing liquid, a latent image is developed, the exposed silver halide is reduced to silver and the unreduced silver halide forms a soluble silver complex which is transferred from undeveloped areas to the image-receiving surface, silver thereof being precipitated so that an image is formed on the latter in silver. In the production of a color transparency, substances capable of forming dye images at the image-receiving surface, such as complete dyes, color couplers, or the like, may be employed in the transfer process. Methods and film materials for producing black-and-white or multicolored images, of categories broadly related to those contemplated herein, are described in U.S. Patents Nos. 2,543,181, 2,614,926, 2,707,150, 2,968,554 and 2,983,606.

In accordance with the foregoing considerations, a principal object of the present invention is to provide a photographic film unit or assembly of a miniature format, such as 24 x 35 mm., which, upon its withdrawal from a camera and, thereafter, the performance of a simple manipulation, is in the form of a completely mounted transparency, ready for direct viewing or projection.

Other objects are to provide a film unit of the character described which, after its exposure and processing in a suitable camera, is in the form of a transparency, in full color; to provide a film unit of the aforesaid type comprising a substantially rigid mount for framing an image area; to provide a film unit as described having a structure which permits proper spreading and retention of a processing liquid when released from a container element of the film unit; to provide a film unit of the type described having a suitable leader separably attached to the rigid mount; and to provide means for supplying a plurality of said film units for exposure and processing in a camera.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic perspective view of the magazine and contained film units, prior to their being loaded in the camera;

FIG. 2 is a diagrammatic perspective view of the magazine and contained film units as they would appear when loaded in the camera;

FIG. 3 is a diagrammatic side view of the loaded magazine;

FIG. 4 is a diagrammatic perspective view of the magazine pressure plate assembly;

FIG. 5 is a diagrammatic side view of a camera adapted to photographically expose and process film units of the invention;

FIGS. 6 through 9 are diagrammatic rear views of the film unit of the invention with special reference to the slide mount, liquid container and leader;

FIGS. 11 through 13 are diagrammatic perspective views of film units of the invention illustrating the function of certain structural features; and FIGS. 14 through 17 are fragmentary side views, partly in cross section and greatly exaggerated in dimensions, of film unit structures of the present invention.

Figure 8:
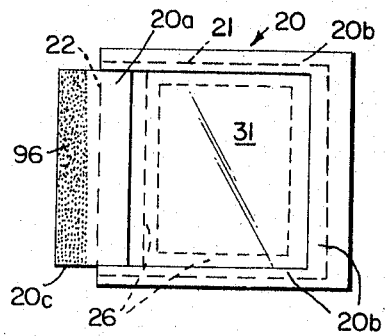

To produce a film material of a multilayer self-processing type for use in a miniature camera, that is, a film containing, within itself, a releasable processing liquid, presents a special dimensional problem. As is well known, a conventional 35 mm. film is customarily provided in a compact roll. But, because of the inherently somewhat bulky nature of the aforesaid self-processing film, due to the inclusion of the processing liquid, of a so-called image-receiving layer, or of some other structural element, it would be practically impossible to equal in such a film the compactness of the conventional 35 mm. roll for a like number of exposures. Where a camera is a self-processing camera but of a much larger type than that of the present invention, such as any of several models now sold by Polaroid Corporation of Cambridge, Mass., roll films are practicable and are employed because, in view of the much greater dimensions of these cameras, there is ample space to accommodate them.

A further and important consideration is the essentially rigid slide mount incorporated with each film unit of the present invention. Obviously, such a mount could not be bent appreciably at any stage, and certainly not to the extent necessary in a compact roll, and serve its later function as a flat, generally rigid mounting means for a transparency, during projection. With the aforesaid factors in mind, that is, to satisfy the specification of a self-processing film for a camera of small dimensions and, morevoer, the provision of a film mount for each exposed frame, the present invention solves the attendant problems by providing film structures in the form of individual assemblies or units composed of mounted film components which can readily be accommodated in a miniature camera and which can be advanced to exposure and processing locations in the camera and then removed entirely from the camera, each film unit being maintained in a flat condition throughout its movement.

Referring now to FIGURE 1, a container or a magazine 10, having an aperture 12, fully loaded with film units 14 of the present invention, is illustrated as it would appear prior to its placement in the camera. The magazine 10 is preferably formed of a thermosetting or thermoplastic material as, for example, a polystyrene. The exit aperture or slot 12 permits lateral withdrawal of the film units. An opaque cover sheet 18, such as a sheet of light-absorbing paper having an adequate tear resistance, is releasably fastened to the edges 10a at the front or open face of the magazine, as by a pressure-sensitive or other appropriate adhesive. The terms "front" and "rear" or "forwardly" and "rearwardly," or "outer" and "inner" as used herein, refer, respetcively, to proximity to or remoteness from the front of a camera, that is, the camera lens, which would exist when the film units are mounted in the camera. Sheet 18 is folded back, on itself, at 18a and includes a leader portion 18b, shown in part, only. Alternatively, the cover sheet 18 may be folded over the edge of the magazine and be releasably attached to the side of the latter to obtain an additional purchase and bonding surface. The cover sheet 18 is stripped or peeled from the magazine after loading of the latter in the camera by manually pulling on the leader portion 18b, said portion being positioned, during the aforesaid loading operation, so as to extend through an exit port of the camera. Other methods for releasably attaching the cover sheet 18 to the magazine 10 contemplate the provision of an hermetical seal and a cover material having serrations or partial perforations along marginal portions to facilitate its removal.

Figure 9:
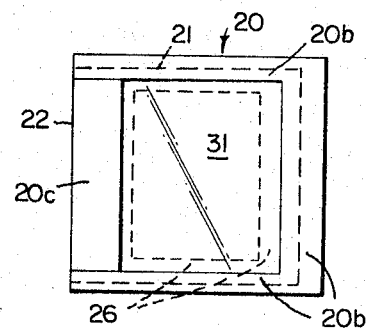

In FIG. 2 the magazine 10 and film units 14 are shown as they would appear with the cover sheet 18 removed, it being assumed that they are now positioned in the camera and held within the magazine by focal plane means of the latter. The film unit 14 shown in detail in FIGS. 6 through 10, comprises a flat, substantially rigid frame-like mount 20 composed, for example, of an essentially moisture-proof, stiff cardboard, a plastic, or other suitable material and including a front section 20a and a rear section 20b. A spacer element 21, shown in FIG. 6 and composed of a thin cardboard or the like, is positioned between the front and rear sections along three sides, exclusive of that of a flap or leaf portion 20c which is actually an extension of one side of the front section 20a. The front and rear sections are coated on their inner or facing surfaces with a heat-sealing adhesive 23 such as a polyethylene and are bonded to opposite surfaces of the spacer 21 thus effecting an integral condition of the front and rear sections. The front and rear sections terminate similarly along their sides, exclusive of that of the flap 20c, and are aligned to form two short, firm leading edge portions 20d which are used as essentially unyielding contact means, in conjunction with means of the camera, to control advancement of a film unit therewithin, as described below. When processing of the film component has been completed, the flap 20c is adapted to be folded over or pivoted 180° against itself along the semi-perforations 22, this step or manipulation having been performed in the showings of FIGS. 9 and 10. The front section has a rectangular exposure aperture 24 formed therein, within the inner margins of which is a thin opaque masking element 26 constituting a second or inner enclosing frame forming a second slightly small aperture 28 within the aperture 24. The element 26 is composed, for example, of a metallic sheet material such as aluminum, or a metallized plastic such as polyethylene terephthalate sold by E. I. du Pont de Nemours & Co., Wilmington, Del., under the trade name of Mylar. Masking element 26 is bonded along marginal areas surrounding aperture 24 to the rear surface of front section 20a, its edges being adjacent to or abutting those of the spacer 21, and contributes to a sharply outlined picture area, as will be explained below. If the mount 20 is composed of a plastic material it could be formed as a single piece of proper contours, eliminating the separate front and rear sections and spacer.

The rectangular aperture 28 may, for example, be considered as having the dimensions of the conventionally exposable area of a 24 x 35 mm. film, or it may have the dimensions of another film material such as one customarily associated with a miniature camera. Assuming the 24 x 35 mm. miniature format of film, the short or 24 mm. dimension of the aperture is parallel to the direction of withdrawal of a film unit from the magazine 10. While this is, perhaps, a preferred arrangement in view of a contemplated camera design shown in FIG. 5 which would permit the camera to be held vertically for a horizontal exposure, it is not essential. Thus, the long dimension of aperture 28 could be parallel to the aforesaid direction of withdrawal, if desired, in which case the camera could be held horizontally to obtain a horizontal picture. If the film is of a type having a square image area, the camera could be held, of course, in either position for a similar result.

A film material 30, similar in width to the transverse dimensions of mask 26 so as to abut the inside edges of the spacer 21 and comprising one or more photosensitive layers, is adapted to have an image formed therein by a diffusion transfer method of the character previously described. The film 30 is mounted adjacent to the front section 20a as, for example, by having its edges inserted in non-bonded marginal areas or slots 32 (see also FIG. 10) existing between the areas 20a and 20b of the front and rear sections of the mount which are not occupied by the spacer 21. The film is attached along a narrow band 23a of adhesive 23 to the front section 20a and is exposable through the aperture 28, the visible surface of the film component 30, as seen in FIG. 2, being the transparent film base or support through which a rearwardly lying silver halide emulsion of the unit is exposed. The relative thicknesses of the spacer (e.g., .009″), mask (e.g., .0025″) and film (e.g., .006″) are so chosen as to permit the film freedom of movement excepting along the aforesaid bonding band or strip 23a to substantially prevent any unwanted restraint which might result in buckling during projection.

Figure 11:
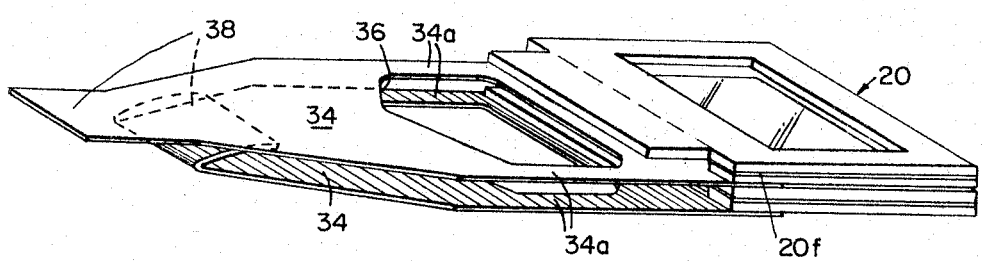

Each film unit 14 also includes a separable leader 34, attached to the rear section 20b of mount 20, suitably composed of an opaque paper with an aperture 36 formed therein, the purpose of which will be described hereinafter, and a draw tab 38 at its extremity for manually advancing the film unit from the exposure to the processing stage and, thence, to a location exteriorly of the camera. The material of the leader 34 and draw tab 38 is preferably somewhat resilient so that the draw tab will possess a certain functional elasticity when folded over, as shown in FIGS. 11 and 12, for a reason to be described.

The tab 38 of the front or foremost film unit extends through an aperture of the camera where it can be grasped manually. A number, such as the number "1" shown in the illustration, is printed on the tab to indicate which film unit is positioned for exposure and, assuming a known complement of the magazine, to advise the operator how many film units remain in the magazine. The position of the number "1" tab, as shown, is achieved either by reason of the tab's being thus extended when supplied or, alternatively, through the instrumentality of its being folded over but with its tip lightly and separably bonded to the under or rear side of the cover sheet 18 so that removal of the latter pulls the tab to the extended position.

The magazine 10 is shown in greater detail in FIGS. 3, 4 and 5. It comprises a pressure plate 40 including a compression spring 42 for urging the contained film units 14 forwardly so as to place the foremost unit at the focal plane of the camera. The compression spring 42, in the example, is composed of cut-out portions of the pressure plate itself, the material thereof being a resilient metal or a plastic, e.g., a Phosphor bronze or a thermoplastic resin of the acetal family, respectively. On the rear side of the pressure plate 40 is a spacer element in the form of a disk 44, having a rearwardly-disposed protuberance such as a ball or plug 46, which extends part way into and is frictionally or compressively held by an aperture such as the socket 48 formed in the rear wall of the magazine 10. When the magazine is initially supplied, namely, with a full quota of film units 14 contained therein, the plug 46 is held frictionally in the socket 48, against the bias of spring 42, in a manner akin to that of a snap fastener. This condition of the male and female elements 46 and 48 is that shown in FIG. 3 and one which may be assumed as existing in FIGURE 1. Retention of the pressure plate 40 at the rear of the magazine by the snap fastener elements 46 and 48 permits the use of a relatively light-weight moderately tear-resistant material for cover sheet 18 and imposes no tendency to force it away from the magazine surfaces 10a.

As previously stated, the film units 14 and magazine 10 are primarily adapted to be used in a so-called self-developing or self-processing camera, but of a miniature type as opposed to one of presently conventional proportions for this category of camera. Their structure and function therefore become more meaningful when considered in direct relation to such a miniature camera. This relationship is clearly shown in FIG. 5 wherein the film units and magazine are contained in a camera 50 of the character described. The camera includes front and rear casing sections 51 and 52, pivotally connected at 54 and releasably held at closed position by a latch 56. When the sections 51 and 52 are swung to open position the magazine 10 is mounted in an exposure chamber 58 formed in the rear casing section 52 of the camera. The film units are urged toward a focal plane 60 of the camera by the pressure plate 40 and associated compression spring 42, the foremost film unit being held flat at the focal plane and adapted, after its exposure, to withdrawal from the magazine, endwise, through the exit slot 12.

When the front and rear camera sections 51 and 52 are closed and latched, the rearwardly-extending portions 51a and 51b of the front section, adjacent to the apertured frame-like portion 51c which establishes the aforesaid focal plane 60 and defines the area of the film which is subject to exposure, bear against the forward edges 10a of the magazine thus forcing the magazine rearwardly against the rear wall of the exposure chamber 58. The aforesaid operations cause a small pin or boss 62, projecting forwardly from the rear surface of chamber 58 and which, in light contact with ball 46 of the pressure plate 40, has held the magazine slightly spaced from the rear wall, to enter the aperture 48 of the magazine and force the ball 46 forwardly out of the aperture. This permits the compression spring 42 of the pressure plate to assume control and urge the film units forwardly toward the focal plane, as shown in FIG. 5. The leader 34 is so positioned as to extend through the magazine exit aperture 12, and through an aperture 63 leading into a second or processing chamber 66. The draw tab 38 of the foremost film unit passes between light sealing means 68 and projects from the camera through the exit aperture 64, where it may be grasped, manually, for advancing, through the medium of the leader 34, the foremost film unit, comprising the film 30 and mount 20, into the processing chamber and thence from the camera through the exit 64. It is, of course, to be assumed that the opaque cover sheet 18 has been stripped from the magazine, as previously described, immediately after loading the magazine in the camera and prior to making the first exposure.

Other more or less conventional elements of a camera suitable for use with the film unit of the present invention include a shutter release button 70, a lens and diaphragm mounting and adjusting means 72, a focus adjusting means 74, finder means 76, and a photocell 78 for providing some measure of automatic light control. Additional camera elements, more particularly cooperating, from a functional viewpoint, with the novel structural features of the film unit, include rotatable and fixed pressure-applying members 80 and 82, a flat springlike member 84 which exerts a slight pressure against the rearmost of a plurality of the film unit leaders 34 as positioned in the processing chamber 66, detent means 86 and 88 engageable with the edge portions 20d of the film unit at different stages of its advancement, and interlock means 90 and 92 associated with the aforesaid detent means 86 and 88. The camera housing sections 51 and 52 are so contoured in portions enclosing the processing chamber 66 as to constitute a so-called pistol grip 93 for most conveniently holding the camera during picture taking.

Further referring to the film unit, especially as shown from the rear in FIG. 6, the leader 34 is attached at 34b to marginal areas of the rear section 20b of the film mount by a manually-separable adhesive means such, for example, as a pressure-sensitive heat-resistant adhesive of the type of a very firm synthetic rubber resin adhesive. Such an adhesive may, conveniently, be provided in the form of a double-faced tape.

An opaque cover sheet 94 is superimposed with the rear or emulsion surface of the film material 30 in the area bounded by the side members 20b of the rear section. As shown in FIG. 6, the cover sheet 94 is unitary with, that is, it is an extension of, the leader 34 but it may be an individual element attached to the flap 20c by a band 96 of the aforesaid adhesive as illustrated in FIG. 7. In the latter instance, leader 34 may be independently attached to mount 20, e.g., along opposite sides 20b. On the other hand, if the camera is of a so-called "programmed" type wherein the film unit is advanced and fully controlled by mechanism of the camera, the leader may be dispensed with entirely. The cover sheet 94 serves as a shield to prevent light from passing completely through a given film unit to the film unit which succeeds it in the magazine thus preventing unwanted exposure of the succeeding film units when the foremost film unit is exposed. It likewise acts as a barrier sheet during the release and spreading of the processing liquid which occur between it and an adjacent silver halide emulsion or other layer of the film. In either of the above-described constructions the cover sheet 94 is attached, either individually or as a part of leader 34, to the mount 20. Additionally, it could be attached to marginal portions af the film 30, preferably outside of the area to be exposed. After the processing operation, the cover sheet and waste portions of the film unit are to be stripped away, as will be explained hereinafter. A narrow band of tear-resistant material, e.g., a paper, is positioned between the cover sheet 94 and the adhesive 96 so as to extend transversely thereacross, with a small tab portion 97 protruding outwardly, to be grasped manually. This facilitates stripping away the cover sheet, as above described. A container or pod 98, releasably holding a processing liquid, is attached to the inner or forward surface of the cover sheet 94 so as to overlap one edge of the film 30. When subjected to compression, the container is rupturable along those of its sealed edges or other given separable portions which are located adjacent to the film 30. A container of the nature contemplated may, appropriately, be composed of a liquid impervious sheet material or materials and be of a type such as described in detail in U.S. Patents Nos. 2,543,181 or 2,968,-554. When, after its exposure, the front film unit is drawn progressively between the pressure-applying means 80 and 82 of the camera by manually pulling on the tab 38, the processing liquid is released from the container and spread over the adjacent surface of the film component 30, the liquid being imbibed into the film and functioning, in a diffusion transfer process, in a manner dependent on the nature of the processing liquid and the particular structure of the film, that is, depending upon whether the film is of a black-and-white type or a certain category of color film, etc., as described hereinafter.

The spacing between the transversely located portions 20B of the mount, as may especially be noted in FIGS. 6 and 7, is such as to permit the pressure-applying means 80 and 82 to bear on the structure lying between said portions, namely, on the cover sheet 94 and the underlying liquid container 98 and film 30 so as to most efficiently rupture the container and spread the released liquid. The extended flap 20c permits the pressure-applying means 80 and 82 to bear, through the intervening flexible cover sheet 94, on opposite sides of the front section, only, until reaching the container 98 and film 30, thus placing the least possible thickness of the mount between the compressive means prior to progressively applying compression to the film component 30. The structure, entailing flap 20c, permits an essentially direct compression of the container 98, enables the use of a wider container than would otherwise be possible, and enables a protective recess for the container between the mount portions 20b. The folded-over marginal portions 102 of the cover sheet 94 constitute additional barrier or trapping elements to hold the processing liquid confined between the cover sheet and the film 30 thus contributing to the spreading of an even and complete layer of the liquid and preventing escape of any portion thereof from the film assembly into the camera mechanism. Also, the cover sheet being composed of a paper or toher material having a certain resiliency, the folded portions 102 are adapted to contact the film component 30 firmly and serve in a light-shielding capacity. The masking means 26 enables the application of compression to areas beyond the limits of the actual image area thus insuring spreading of the processing liquid at least throughout said image area.

During withdrawal of the foremost film unit from the exposure chamber 58 the detent means 86, in contact with the edge surfaces 20d, is caused to pivot in a clockwise direction, as seen in FIG. 5, around the bearing 87. This causes movement of the interlock means 90 and 92, said means being, respectively, a transversely movable spring-loaded shaft and a multi-angled rod, to the latter of which torque is applied through thrust of the shaft 90, such that the detent means 88 is permitted to move rearwardly so as to contact the leader 34 and, thereafter, to contact the edge surfaces 20d of the film unit when the latter is drawn to a location contiguous therewith. The detent means 88, in contacting the surfaces 20d, acts as a limit stop to hold the film unit in the processing chamber 66 until the detent means is manually released. It may be retained in the processing chamber for the given brief period determined as suitable for completing the processing step. Each of the detent means 86 and 88 preferably comprises a pair of detent elements of the type shown which are spaced apart transversely and adapted to contact the edges 20d located at both sides of the flap 20c, the two contacting edges 20d being provided to avoid any possible twisting of the mount due to restraint being exerted at one side only. Assuming processing to have been performed in the chamber 66, the interlock means 90 and 92 are manipulated manually to remove the pair of detents 88 from contact with the edges 20d by actuating means (not shown), namely, by pressing upon an extension of the shaft 90 which projects outwardly through the camera housing. The camera mechanism involved in the foregoing operations is more fully described, as previously mentioned, in the copending U.S. patent application Serial No. 248,092, filed concurrently herewith.

Figure 10:
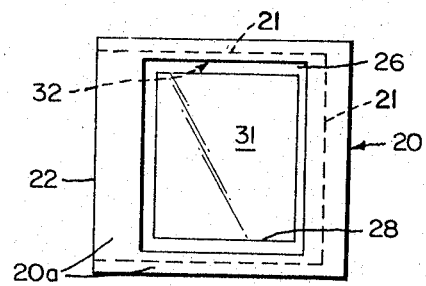
FIG. 10 is a digrammatic front view of the completed mounted transparency.

Following the withdrawal of the detents 88, the entire film unit can be removed from the camera through the exit slot 64. After the film unit has thus been removed, the leader 34 and cover sheet 94, with the exhausted liquid container 98 attached to the latter, are stripped from the transparency mount 20 and discarded, one or more layers of the film component adhering to the sheet 94 and being discarded also, as will be explained below. After the aforesaid stripping operation there is left the assembly consisting of a transparency 31 and mount 20 shown in FIG. 8. Again referring to the spacing between the transverse portions 20b, this spacing serves not only to permit a most efficient exertion of force by the compressive means, as above described, but permits the ready application of any subsequent treatment of the film component as may be advisable, e.g., the application of a coating of a stabilizing liquid. The edges of the aforesaid portions 20b serve as guide means to facilitate linear movement of an applicator containing such a liquid. The extended flap 20c provides a clear path in a single plane approaching the film component 31 for moving an applicator so as to contact the film component 31 most efficiently. Assuming any final treatment of the film 31 to have been completed, the flap 20c is then folded over along the semi-perforations 22 and fastened to the underlying portion of the front section 21 by the pressure-sensitive adhesive 96 to produce the finished assembly of FIG. 9. In FIG. 10, the completed assembly is shown as it would appear from the front.

FIGS. 11, 12 and 13 illustrate various conditions of the film units 14 while static or while being advanced in the camera 50. Thus, in FIG. 11 the relation of the foremost and next-succeeding film unit is shown with the foremost unit at the focal plane. The draw tab 38 of the foremost unit will be noted as extending straight ahead in a position which would result in its protruding through the exit slot 64 of the camera, as shown in FIG. 5. The draw tab 38 of the succeeding unit is folded over on itself, however, so as to bear against the rear surface of the leader 34 of the foremost film unit and, as previously stated, may advantageously be composed of a resilient material to facilitate the degree of force by which it thus bears. In FIG. 12, the foremost film unit is undergoing movement and has been advanced to an extent which would place it well into the processing chamber 66 of the camera. The folded-over draw tab of the second or succeeding film unit, due to its resilient property and as facilitated by the flat spring member 84 of the camera which bears forwardly against the leaders, has sprung forward into the aperture 36 of the foremost unit. Continued advancement of the foremost film unit will cause the leading linear edge 20e of said foremost film unit to enter and exert pressure against the fold of the tab 38. This unfolds and straightens the tab so that it lies in the plane of the leader and extends through the exit slot 64, in readiness to be grasped for advancing the second film unit after the foremost film unit has been completely withdrawn from the camera. Thus, to recapitulate, the withdrawal of a given film unit from the camera automatically pulls the tab of the next succeeding film unit of aperture 64, for use, subsequently, in withdrawing the latter film unit. FIG. 13 illustrates the location of the pressure-applying means 80 and 82 with respect to the leaders 34 of the film units (the foremost film unit, only, being shown) when located in the exposure chamber. The pressure-applying means will be noted as lying within the lateral limits of the aperture 36, that is, between the transverse connecting strips 34a of the leader, thus preventing a situation in which a stack of leaders of overall varying thickness is located between the pressure-applying means.

As previously intimated, film units or assemblies of the present invention are adapted to the production, by a diffusion transfer process, of either black-and-white or full-color mounted transparencies depending upon the photochemical properties of the film and, in the case of colored transparencies, upon the presence of color-providing components or substances in the film structure. In FIG. 14, for example, there is shown, partly in cross-section, a fragment of a film unit 104. This type of film unit, when exposed and processed in a camera of the character hereinbefore described, provides a mounted black-and-white transparency. The film unit 104 comprises the front section 20a of the mount 20; the masking element 26; a transparent base or support 106; a transparent image-receiving layer 108; a silver halide emulsion layer 110, as, for example, a panchromatic emulsion; the opaque sheet 94 serving a light-shielding and liquid barrier function, the container 98 attached to barrier sheet 94 and releasably carrying a preferably viscous processing liquid of a type previously described, and the rear section 20b of the mount 20. The assembly of layers within the dotted lines and designated 30 is that which constitutes the film component 30 shown in FIGS. 2, 6 and 7, that is, the assembly prior to the stripping away of certain portions, described below. The spacing between the barrier layer 94 and the section 20b is greatly exaggerated in FIGS. 14, 15 and 16 to clearly show the container 98, it being understood that the processing liquid is released between the sealed edges 98a when the complete film unit is passed between compressive means of the type 80 and 82 of FIG. 5. Furthermore, the entire film component 30 of the unit is so thin that the front and rear sections 20a and 20b of the mount, although shown as widely spaced apart, are actually contiguous and bonded together along outer marginal areas as indicated at 20f of FIG. 11, the film component 30 and barrier sheet 94 occupying the area lying laterally between the aforesaid sections, as clearly shown in FIGS. 6 and 7. As previously stated, the image is formed, after exposure of the photo-sensitive emulsion 110 to light from the photographic subject traveling in the direction indicated, by passing the entire film unit between pressure-applying means, with an accompanying release and spreading of the processing liquid between the layers 94 and 110, and imbibition of the liquid into the emulsion layer 110. Image-forming components are transferred from layer 110 to the image-receiving layer 108 in a manner hereinbefore described. A so-called strip-coat or stripping layer 112 of a transparent material, e.g., of carboxymethyl cellulose or cellulose acetate phthalate is provided so that the layer 110 and sheet 94 may be stripped away, together, from the remainder of the assembly after formation of the image on the image-receiving layer 108 to form the modified film component 31 carrying the visible image. The mounted film component 31, composed of layers 106 and 108 and essentially constituting the final transparency, is shown from the rear in FIGS. 8 and 9 and from the front in FIG. 10. The base layer 106 is composed of cellulose acetate, cellulose acetate butyrate or any other suitable transparent material. The image-receiving layer may, for example, be composed of gelatin, polyvinyl alcohol, deacetylated chitin, or the like. These materials may also be employed in forming the equivalent components of the structures of FIGS. 15, 16 and 17. It will be understood that subcoats are employed as may be necessary for receptivity of coatings and for bonding purposes.

A fragmentary portion of a film unit 114, adapted to provide a mounted full-color transparency by a subtractive method when exposed and processed in a camera such as that of FIG. 5, is shown in FIG. 15. The film unit 114 comprises the front section 20a of the mount 20; the masking element 26; a base or supporting layer 116; an image-receiving layer 118; a stripping coating or layer 112; a blue-sensitive silver halide emulsion layer 120; a yellow dye developer layer 122; a green-sensitive silver halide emulsion layer 124; a magenta dye developer layer 126; a red-sensitive silver halide emulsion layer 128; a cyan dye developer layer 130; the opaque barrier or cover sheet 94, the liquid container 98 attached to the sheet 94 and releasably carrying an alkaine processing liquid of the character previousy described, and the rear section 20b of the mount 20. The stripping layer 112 and aforesaid layers 116 through 128 are necessarily transparent to permit transmission of image-forming rays during the photographic exposure.

In a multicolor film component of the general type represented by the assembly comprising layers 116 through 130 of FIG. 15, there is associated with each emulsion a color-providing substance, e.g., a dye developer which is a complete dye containing in the same molecular structure a silver halide developing property. Alternatively, the color-providing substance could be an intermediate or color coupler for providing an image-forming dye. In general, such image-forming dyes are complementary in color to the sensitivity of their respective emulsions. Although shown in individual layers adjacent to their related emulsion layers, the dye developers could, as is well known, be incorporated with the emulsion layers. Assuming exposure of the aforesaid negative to a multicolored subject and imbibition of the released processing liquid into and sustantially throughout the structure of the negative, the exposed silver halide is developed, the oxidation product of the dye developer is immobilized or becomes insoluble in exposed areas, and unoxidized dye developer remains soluble in unexposed areas as a function of development, is dissolved in the processing liquid and transfers to the image-receiving layer 118. There is thus provided in the latter registered color-separation images in yellow, magenta and cyan, together forming a multicolored image.

Again referring to FIG. 14, it is to be understood that in lieu of the cover sheet 94 being opaque, a suitable opaque layer may be coated on that side of the photosensitive layer 110 closest to cover sheet 94, namely on the rear surface thereof. Alternatively, the aforesaid coating may be provided on layer 110, in addition to the opaque cover sheet 94, to doubly prevent the passage of any light through the entire unit to a succeeding film unit. Another adaptation contemplates the provision of a light-reflective coating on the aforesaid rear surface of photo-sensitive layer 110, as, for example, a coating of barium sulfate or titanium dioxide, preferably in conjunction with the light-absorbing or opaque cover sheet 94, although the light-reflective layer could conceivably serve, of itself, as an adequate light shield. Wherein a light-reflective coating is employed, it is adapted to increase the effective sensitivity of the photo-sensitive layer 110. In the example of FIG. 15, the desired opacity of the film unit 114 with respect to succeeding film units, when the magazine is mounted in the exposure chamber of the camera may, instead of by means of the cover sheet 94, be provided by the opaque characteristics of the cyan dye developer layer 130, per se, to which layer, if deemed advisable, may be added an agent, such as carbon black or some other non-diffusible light-absorptive substance for increasing its opacity. If it is desired to incorporate a light-reflective layer in a multicolor negative of the type comprising layers 116 through 130 of FIG. 15, as, for example, to improve the photosensitivity of the several emulsion layers, a coating of one of the aforesaid light-reflective substances, e.g., titanium dioxide may be provided between the red-sensitive emulsion layer 128 and the layer 130 of cyan dye developer. In such an instance, it will be understood that the cyan dye developer is adapted to diffuse through the layer of titanium dioxide to the layer 128 in response to permeation by the processing liquid.

In FIG. 16 there is shown a fragmentary portion of a film unit 132 adapted to provide a mounted full-color transparency by an additive method of colored image formation or synthesis. The film unit comprises the front section 20a of the mount 20; the masking element 26; a transparent base layer 134; a transparent additive color screen 136 composed, for example, of red, green and blue screen components 138, 140 and 142, respectively, which may be arranged geometrically or as an irregular mosaic; a transparent image-receiving layer 144; a transparent strip-coat 112; a silver halide emulsion layer 146, e.g., a panchromatic silver halide emulsion; the barrier or cover sheet 94, the liquid container 98 releasably holding a processing liquid of a type previously described, and the rear section 20b of the mount. After completion of the photographic exposure in the direction indicated, that is through the base 134, through the screen elements 138, 140 and 142 serving at this stage as color-separation filters for "taking" purposes, and through the image-receiving layer 144 to the emulsion layer 146, the additive type multicolor negative comprising layers 134, 136, 144, 112 and 146 is subjected to the released processing liquid. Imbibition by the liquid provides a substantially rectilinear transfer of image-forming components, e.g., a soluble silver complex formed from unreduced silver halide, to the image-receiving layer 144 the image being formed on the latter in silver. When processing is complete, the cover sheet 94 and emulsion layer 146 are stripped, together, from the image-receiving layer 144, as facilitated by the strip-coat 112. The completed transparency is viewed through the transparent base, the screen elements 138, 140 and 142, serving at this stage as color-providing elements, being properly aligned with respective image portions rendered in silver to provide, additively, a multi-colored image. An opaque coating may be applied to the rear surface of layer 146 to serve in a light-shielding capacity, described above relative to FIG. 14, if desired. In any of the examples of FIGS. 14, 15 and 16, the cover sheet 94 could releasably contain one or more of the substances necessary to formation of the image, as permitted by the location of said sheet 94.

While film units of the invention incorporating specific film components for forming black-and-white or full-color images have been shown in FIGS. 14, 15 and 16, it is to be understood that modifications of these structures can be made within the scope of the invention. In the case of film units adapted to produce mounted full-color transparencies such modifications may, for example, embrace the use of color couplers or complete dyes other than the dye developers specified.

In FIG. 17 there is shown a film unit structure 147 incorporating features which may be employed in modified versions of film units such as those of FIGS. 14, 15 and 16. Basically FIG. 17 may be taken as a modification of the structure of FIG. 14. The film unit 147 comprises the front section 20a of the mount; the masking element 26; a transparent base 148; a transparent image-receiving layer 150, the container 98 releasably carrying a processing liquid of a type previously described and additionally including an opaque substance such as carbon black; a silver halide emulsion layer 152; the cover or barrier sheet 94; and the rear section 20b. In this example, the processing liquid is opaque and, when released after an exposure under applied compression, it is spread over the front side of the emulsion, namely, that side which is nearest to the exposure aperture 28. Accordingly, after spreading of the processing liquid, the emulsion layer 152 is covered on both sides by light-impervious materials, namely, by the aforesaid processing liquid on one side and by the cover sheet 94 on the other. The film unit can thus be drawn from the camera immediately after passage between the compressive means 80 and 82, that is, without danger of further exposure of layer 152. After removal from the camera, the leader 34, cover sheet 94, the emulsion 152 bearing all of the opaque processing liquid in an at least partially solidified state, and the exhausted container 98 are stripped from the film unit. This enables a rapid succession of exposures to be made in a camera of the type shown in FIG. 5, as it would be unnecessary to retain the film unit in a static condition in the processing chamber 66, even briefly, for processing purposes. The operational principle exemplified by FIG. 17 can be applied to the structure of FIG. 15 by placing the liquid container 98 containing the opaque processing liquid between the layers 118 and 120. Its application to the structure of FIG. 16 would involve placing the container releasably holding the aforesaid opaque processing liquid between the layers 144 and 146. In each instance the processing liquid might contain an ingredient serving the function of the strip coat relative to a layer forming a part of the final transparency or, alternatively, a strip coat could be applied to the proper surface adjacent to which the processing liquid is released.

Other means contemplated for making it possible to withdraw a film unit from the camera immediately after the release and spreading of the processing liquid include the introduction, e.g., from a roll, coil or other means associated with the film unit or camera, of an opaque sheet material or film to the front surface of the film component 30 at a stage prior to removal of the film unit from the camera. This surface would be the outer surface of the base or support layer in each case, the other side of the film component being rendered opaque by the cover sheet 94 or other means previously disclosed. A still further modification contemplates the use of a desensitizer in an emulsion or emulsions which would become operative to prohibit further exposure of an emulsion just prior to withdrawal of the film unit from the camera.

A different interpretation of FIG. 17, unrelated to the aforesaid considerations of opacity, assumes that the processing liquid in container 98 is transparent and includes a suitable film-forming ingredient for formation of an image thereon. In such an instance the image could be formed on a solidified layer of the processing liquid. This would possibly permit elimination of the image-receiving layer 150 entirely and deposition of the processing liquid directly on the base 148. While a specific camera structure has been shown herein in FIG. 5, it is to be understood that the film unit of the present invention is not limited to use therewith. Thus, for example, the film unit could be exposed and processed in a camera wherein the actuation of camera mechanism would be effected either to a greater or to a lesser degree than that described herein through contact of said mechanism with portions of the film unit during the latter's advancement. Alternatively, operation of the camera mechanism could be initiated entirely by control means of the camera, per se, rather than in response to moving parts, such as the surfaces 20d, of the film unit.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film unit adapted to be exposed and processed in a camera which includes processing means cooperating with said film unit for effecting a diffusion transfer method of forming an image therewithin, said film unit comprising a substantially rigid mount suitable as a slide mount for projection of said image and having an opening formed therein for exposure and viewing purposes, a film component including in superimposed relation at least an image-receiving surface and a photosensitive material comprising at least one silver-halide emulsion so mounted in said mount as to be coextensive with at least the area of said opening, container means releasably carrying a processing liquid positioned in said film unit so as to overlap an edge of said film component which lies adjacent to a given side of said opening and permit release of said liquid across a surface of said film component, and a cover sheet releasably attached to said mount along at least a leading edge thereof and superimposed with both said film component and said liquid container, said cover sheet including an opaque portion coextensive with at least said mount opening which provides both a barrier relative to the light of said exposure and a barrier for confining said processing liquid, when released, to the vicinity of said film component.

2. A photographic film unit, as defined in claim 1, wherein said film unit is adapted to provide a mounted image in the form of a transparency.

3. A photographic film unit, as defined in claim 1, wherein said film component and processing liquid are adapted to provide a black-and-white image.

4. A photographic film unit, as defined in claim 1, wherein said film component includes a color-providing material and in conjunction with said processing liquid, there is provided full-color image.

5. A photographic film unit, as defined in claim 1, wherein said liquid container is mounted on the inner surface of said cover sheet whereby both said releasably attached cover sheet and container may be stripped together from said mount after said film component has been processed.

6. A photographic film unit, as defined in claim 1, wherein said rigid mount is rectangular and composed of a front section, the sides of which constitute a frame which completely defines said exposure and viewing opening and which includes a flap projecting outwardly from one side in the plane of said section, said flap being shorter than the transverse side from which is projects so as to provide a pair of shoulders at said side, laterally outwardly of said flap, and a rear section which is superimposed with three sides of said front section exclusive of the side from which said flap projects, said film unit being adapted to be so positioned in a camera for a photographic exposure that light rays of said exposure pass first through the opening defined by said front section.

7. A photographic film unit, as defined in claim 6, wherein said front and rear sections are parts of a unitary structure.

8. A photographic film unit, as defined in claim 6, wherein said film component comprises, in order of transmission of the light of a photographic exposure, a transparent base, an image-receiving layer, and said photosensitive material.

9. A photographic film unit, as defined in claim 6, wherein said flap has a pressure-sensitive adhesive on an inner surface and is, of itself, rigid but adapted to be bent inwardly along a line joining it with a side of said front section, so as to become, in effect, a fourth side of said rear section.

10. A photographic film unit as defined in claim 6, wherein a superimposed side of each of said front and rear sections terminates similarly at each side of said flap, forming therewith said shoulders which have a substantially unyielding leading edge structure for contact with detent means of said camera.

11. A photographic film unit, as defined in claim 5, wherein a strip coat between said image-receiving surface and emulsion permits stripping from said film unit of said emulsion with said cover sheet and container.

12. A photographic film unit adapted to be exposed and processed in a camera which includes processing means cooperating with said film unit for effecting a diffusion-transfer method of forming an image therewithin, said film unit comprising a substantially rigid mount suitable as a slide mount for projection of said image and having an opening formed therein for exposure and viewing purposes, a film component including in superimposed relation at least an image-receiving surface and a photosensitive material comprising at least one silver-halide emulsion so mounted in said mount as to be coextensive with at least the area of said opening, container means releasably carrying a processing liquid positioned in said film unit so as to overlap an edge of said film component which lies adjacent to a given side of said opening and permit release of said liquid across a surface of said film component, a leader releasably attached to said mount for advancing said film unit in said camera and withdrawing it therefrom, and a cover sheet releasably attached to said mount along at least a leading marginal portion thereof and superimposed with both said film component and said liquid container, said cover sheet including an opaque component coextensive with at least said mount opening which provides a barrier relative to the light of said exposure and a barrier for confining said processing liquid, when released, to the vicinity of said film component.

13. A photographic film unit, as defined in claim 12, wherein said leader and cover sheet are unitary.

14. A photographic film unit, as defined in claim 12, wherein said leader is narrowed at its extremity to provide a tab for manually pulling upon said leader.

15. A photographic film unit, as defined in claim 12, wherein said mount has a flat, hinged, rectangular portion constituting a flap extending outwardly in the direction in which said leader extends.

16. A photographic film unit, as defined in claim 15, wherein said leader and tab are composed of a resilient material and said leader has an aperture formed therein, the trailing edge of which aperture is linear and is aligned with the leading major edge of said flap, whereby the aligned edges of said aperture and flap are adapted to engage a folded-over tab of a succeeding film unit positioned for exposure at the focal plane of said camera, said folded-over tab, by reason of its resiliency, being caused to spring into said aperture when the first-named film unit is advanced in said camera to a position whereat said aperture is contiguous with said tab.

17. A photographic film unit, as defined in claim 16, wherein the dimensions of said flap and aperture, taken in a transverse direction, that is, at 90° to the direction in which said film unit is advanced in said camera, are substantially similar.

18. A photographic film unit adapted to be exposed and processed in a camera which includes processing means cooperating with said film unit for effecting a diffusion-transfer method of forming an image therewithin, said film unit comprising a substantially rigid mount suitable as a slide mount for projection of said image and having an opening formed therein, a masking element composed of a relatively thin flexible material attached to said mount and extending within said opening to provide a second opening of slightly smaller dimensions than said first-named opening, said second opening defining an image area for exposure and viewing purposes, a film component including in superimposed relation at least an image-receiving surface and a photosensitive material comprising at least one silver-halide emulsion so mounted in said mount as to be coextensive with at least the area of said second opening, container means releasably carrying a processing liquid positioned in said film unit so as to overlap an edge of said film component which lies adjacent to a given side of said opening and permit release of said liquid across a surface of said film component, and a cover sheet releasably attached to said mount along a leading marginal area thereof and superimposed with both said film component and said liquid container, said cover sheet including an opaque area coextensive with at least said mount opening which provides both a light barrier against the penetration of the light of said exposure and a physical barrier for confining said processing liquid, when released, to the vicinity of said film component.

19. A photographic film unit, as defined in claim 18, wherein the supply of said processing liquid in said container is sufficient to cover substantially the entire area of said film to which said liquid is released when said container is subjected to a given compression, including said image area and portions beyond the limits of said image area which are superimposed with said masking element.

20. A photographic film unit capable of providing a fully mounted black-and-white photographic transparency of a miniature format, said film unit being adapted to be exposed and processed in a camera which includes processing means cooperating therewith for effecting a diffusion-transfer method of producing an image, said film unit comprising a substantially rigid mount having a rectangular aperture formed therein suitable as a slide mount for projection of said transparency, a film component including, in order of arrangement with respect to light of a photographic exposure passing through said aperture, a transparent base, an image-receiving surface and a photosensitive material, said film component being so mounted in said mount as to cover at least the area of said aperture, container means releasably carrying a processing liquid positioned in said film unit so as to overlap an edge of said photosensitive material, an opaque cover sheet releasably attached to said mount and superimposed with both said photosensitive material and at least that portion of said liquid container through which said processing liquid is released, said cover sheet providing a barrier for confining said processing liquid, when released, to the vicinity of said photosensitive material and serving as a light shield to prevent light of a photographic exposure, when entering said aperture, from passing beyond the confines of said film unit, and a leader releasably attached to said mount and adapted to extend through an exit aperture of said camera for manually advancing said film unit, said leader, cover sheet, container and photosensitive material being manually strippable from other portions of said film unit after formation of said image to provide said mounted transparency.

21. A photographic film unit capable of providing, subtractively, a fully-mounted multicolored photographic transparency of a miniature format, said film unit being adapted to be exposed and processed in a camera which includes processing means cooperating therewith for effecting a diffusion-transfer method of producing an image, said film unit comprising a substantially rigid mount having a rectangular aperture formed therein suitable as a slide mount for projection of said transparency, a film component of a multilayer structure including, in order of arrangement with respect to the incident light of a photographic exposure passing through said aperture, a transparent base, an image-receiving surface, a transparent blue-sensitive silver halide emulsion, a transparent yellow dye developer, a transparent green-sensitive silver halide emulsion, a transparent magenta dye developer, a transparent red-sensitive silver halide emulsion, and a transparent cyan dye developer, said film component being so mounted in said mount as to cover at least the area of said aperture, container means releasably carrying a processing liquid so positioned in said film unit as to overlap an edge of the layer carrying said cyan dye developer an opaque cover sheet releasably attached to said mount and superimposed with both said multilayer film component and at least that portion of said liquid container through which said processing liquid is released, said cover sheet providing a barrier for confining said processing liquid, when released, to the vicinity of said film component for imbibition thereinto and serving as a light shield to prevent light of a photographic exposure, when entering said aperture, from passing beyond the confines of said film unit, and a leader releasably attached to said mount and adapted to extend through an exit aperture of said camera for manually advancing said film unit, said leader, cover sheet, container and layers of said film component, exclusive of said base and image-receiving surface, being manually strippable from other portions of said film unit after formation of said image on said image-receiving surface to provide said multicolored mounted transparency.

22. A photographic film unit capable of providing, additively, a fully mounted multicolor photographic transparency of a miniature format, said film unit being adapted to be exposed and processed in a camera which includes processing means cooperating therewith for effecting a diffusion-transfer method of producing an image, said film unit comprising a substantially rigid mount having a rectangular aperture formed therein suitable as a slide mount for projection of said transparency, a film component including, in order of arrangement with respect to light of a photographic exposure passing through said aperture, a transparent base, a transparent color screen comprising a plurality of differentially colored screen components, an image-receiving surface and a photosensitive silver halide emulsion, said film component being so mounted in said mount as to cover at least the area of said aperture, container means releasably carrying a processing liquid positioned in said film unit so as to overlap an edge of said emulsion, an opaque cover sheet releasably attached to said mount and superimposed with both said emulsion and at least that portion of said liquid container through which said processing liquid is released, said cover sheet providing a barrier for confining said processing liquid, when released, to the vicinity of said emulsion and serving as a light shield to prevent light of a photographic exposure, when entering said aperture, from passing inwardly beyond the confines of said film unit, and a leader releasably attached to said mount and adapted to extend through an exit aperture of said camera for manually advancing said film unit, said leader, cover sheet, container and emulsion being manually strippable from other portions of said film unit after formation of said image on said image-receiving surface to provide said multicolored mounted transparency.

23. A photographic film unit, as defined in claim 22, wherein said color screen is composed of red, green and blue screen components which operate as color-separation filter means for exposing said emulsion and as color-providing filter means for viewing said transparency.

24. A photographic film unit adapted to be exposed and processed in a camera which includes processing means cooperating therewith for effecting a diffusion-transfer method of forming an image, said film unit comprising a substantially rigid mount suitable as a slide mount for projection of said image and having an opening formed therein for exposure and viewing purposes, a film component including an image-receiving surface and a strippable photosensitive material so mounted in said mount as to cover at least the area of said opening, container means releasably carrying a processing liquid positioned substantially between said image-receiving surface and said photosensitive material and overlapping an edge of said film component which lies adjacent to a given side of said opening, and a cover sheet releasably attached to said mount and superimposed with a side of said photosensitive material opposite to that at which said container is located, said cover sheet providing a barrier for confining said processing liquid, when released, to the vicinity of said film component and said processing liquid containing an opaque substance.

References Cited by the Examiner

UNITED STATES PATENTS

| | | | |
|---|---|---|---|
| 2,855,302 | 10/1958 | Land | 96—76 |
| 2,873,658 | 2/1959 | Land | 95—13 |
| 2,982,650 | 5/1961 | Land | 96—76 |

NORMAN G. TORCHIN, *Primary Examiner.*

J. TRAVIS BROWN, *Examiner.*